US011990696B2

(12) United States Patent
Bohlmann et al.

(10) Patent No.: US 11,990,696 B2
(45) Date of Patent: May 21, 2024

(54) PLUG-IN DEVICE

(71) Applicant: Allstate Insurance Company, Northbrook, IL (US)

(72) Inventors: Chad W. Bohlmann, Oak Park, IL (US); Emad S. Isaac, Downers Grove, IL (US); Nathan Link, Chicago, IL (US); David Tibbetts, Schaumburg, IL (US); Brad Hanson, Chicago, IL (US); Ryan Satterlee, Chicago, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 808 days.

(21) Appl. No.: 17/015,587

(22) Filed: Sep. 9, 2020

(65) Prior Publication Data

US 2021/0143565 A1 May 13, 2021

Related U.S. Application Data

(60) Provisional application No. 62/898,916, filed on Sep. 11, 2019.

(51) Int. Cl.
*H01R 12/58* (2011.01)
*H01Q 1/24* (2006.01)
(Continued)

(52) U.S. Cl.
CPC ........... *H01R 12/58* (2013.01); *H01R 12/523* (2013.01); *H01R 12/7023* (2013.01); *H01R 12/7076* (2013.01); *H01R 12/735* (2013.01); *H01R 2107/00* (2013.01); *H01R 2201/02* (2013.01); *H01R 2201/26* (2013.01)

(58) Field of Classification Search
CPC ...... H01Q 1/243; H01Q 1/246; H01Q 1/1221; H01Q 5/314; H01Q 9/0414; H01Q 9/0421; H01Q 21/065; H01Q 21/205; H01R 12/57; H01R 12/523; H01R 12/735; H01R 12/7023; H01R 12/7076
See application file for complete search history.

(56) References Cited

U.S. PATENT DOCUMENTS 6,121,935 A * 9/2000 Reece ...................... H01Q 9/28 343/795
6,323,743 B1 * 11/2001 Zelenz .................. H01R 24/42 333/172

(Continued)

OTHER PUBLICATIONS

Nov. 30, 2020—(WO) International Search Report & Written Opinion—PCT/US2020/050097.

*Primary Examiner* — Tung X Le
(74) *Attorney, Agent, or Firm* — Akerman LLP

(57) ABSTRACT

Aspects described herein may allow for a plug-in device including a base having a plurality of apertures extending therethrough. A first PCB has a first surface defining a first plane, and a plurality of pins connected to and extending outwardly from the first surface, with each pin being received in one of the apertures of the base. A bracket secures the first PCB to the base. A second PCB is secured to the bracket, extending outwardly from the first PCB and defining a second plane, with the second plane being at an acute angle with respect to the first plane. An antenna housing is secured to the bracket and the second PCB and includes at least a first antenna. A cover is releasably secured to the base.

20 Claims, 9 Drawing Sheets

(51) Int. Cl.

| | |
|---|---|
| ***H01R 12/52*** | (2011.01) |
| ***H01R 12/70*** | (2011.01) |
| ***H01R 12/73*** | (2011.01) |
| *H01R 107/00* | (2006.01) |

(56) References Cited

U.S. PATENT DOCUMENTS

| | | | | |
|---|---|---|---|---|
| 7,446,714 | B2 * | 11/2008 | Biddulph | H01Q 21/205 343/893 |
| 10,777,877 | B2 * | 9/2020 | Su | H01Q 1/2291 |
| 2008/0030963 | A1 | 2/2008 | Middlekauff et al. | |
| 2014/0104776 | A1 | 4/2014 | Clayton et al. | |
| 2015/0171529 | A1 | 6/2015 | Tu et al. | |
| 2016/0084657 | A1 | 3/2016 | Schilling et al. | |
| 2017/0020011 | A1 | 1/2017 | Fantin et al. | |
| 2017/0025750 | A1 * | 1/2017 | Su | H01Q 1/50 |
| 2018/0226718 | A1 * | 8/2018 | Anderson | H01Q 1/1207 |
| 2021/0030932 | A1 * | 2/2021 | Brar | H01Q 1/241 |

* cited by examiner

PLUG-IN DEVICE

RELATED APPLICATIONS

This application claims priority to U.S. Application Ser. No. 62/898,916, filed Sep. 11, 2019, which is hereby incorporated herein by reference in its entirety for all purposes.

FIELD OF USE

Aspects of the disclosure relate generally to a plug-in device to be inserted into an on-board diagnostic device port of a motor vehicle. More specifically, aspects of the disclosure may provide for plug-in device with a first printed circuit board mounted to a base and a second printed circuit board mounted at an angle with respect to the first circuit board.

BACKGROUND

Plug-in devices are commonly inserted into on-Board diagnostic ("OBD") device port of a motor vehicle for various purposes such as diagnosing problems with the vehicle, and collecting telematics information from the vehicle. The amount of information to be collected by, and the capabilities of, such plug-in devices each have increased over time, resulting in more and more function being packed into the printed circuit boards ("PCB's") contained within the plug-in devices. Reducing the size of a plug-in device while still providing the needed functions has presented challenges to designers of plug-in devices.

It would be desirable to provide a plug-in device for use with an OBD device that reduces or overcomes some or all of the difficulties inherent in prior known devices. Particular objects and advantages will be apparent to those skilled in the art, that is, those who are knowledgeable or experienced in this field of technology, in view of the following disclosure and detailed description of certain embodiments.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a plug-in device including a base having a plurality of apertures extending therethrough. A first PCB has a first surface defining a first plane, and a plurality of pins connected to and extending outwardly from the first surface, with each pin being received in one of the apertures of the base. A bracket secures the first PCB to the base. A second PCB is secured to the bracket, extending outwardly from the first PCB and defining a second plane, with the second plane being at an acute angle with respect to the first plane. An antenna housing is secured to the bracket and the second PCB and includes at least a first antenna. A cover is releasably secured to the base.

By providing a plug-in device with a first PCB mounted to a base portion and a second PCB mounted to the base portion at an acute angle with respect to the first PCB, a more compact plug-in device can be provided to users, which advantageously reduces the chances of the user bumping into the device while in a motor vehicle. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
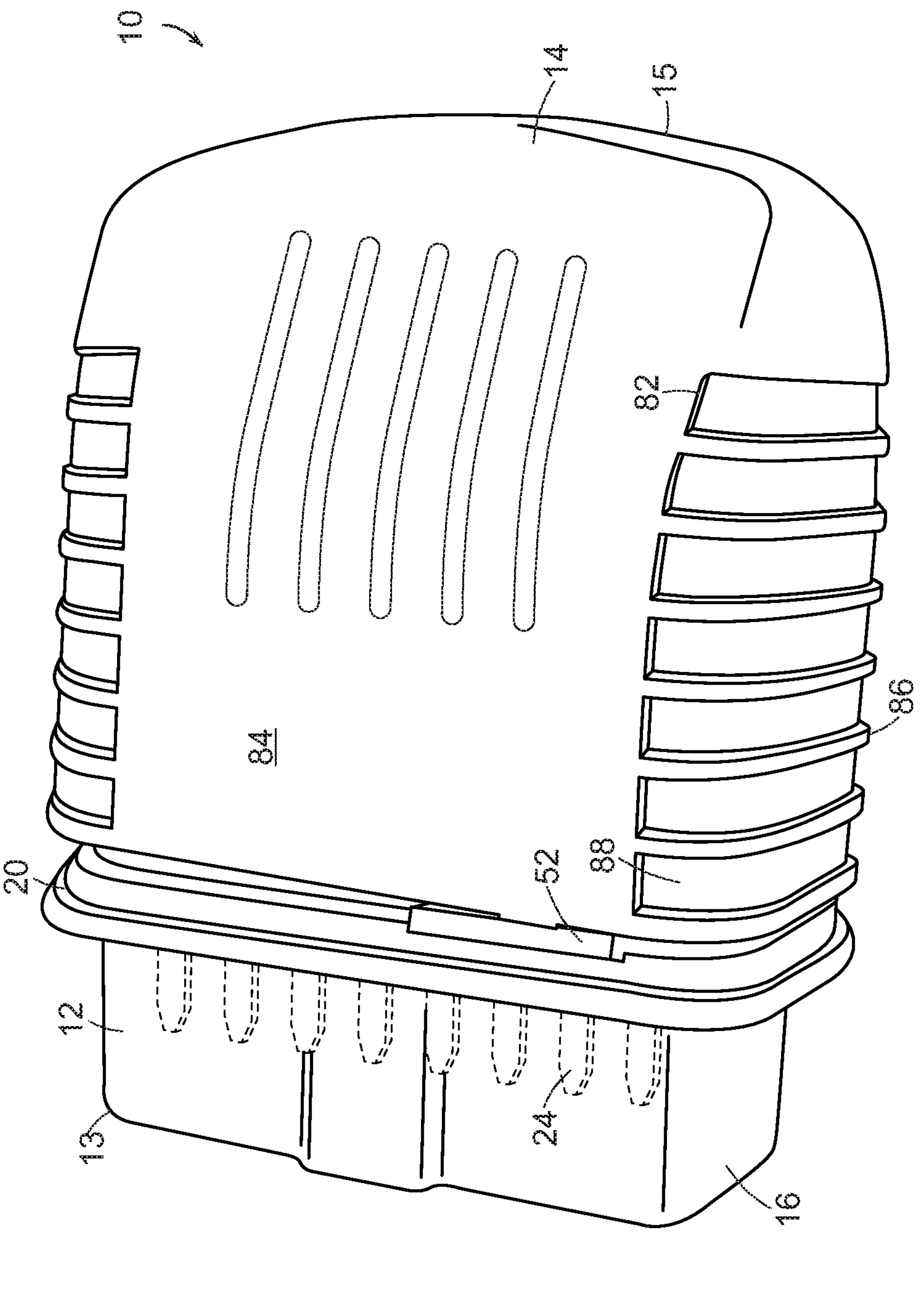
FIG. 1 depicts a perspective view of an example of a plug-in device in accordance with one or more illustrative aspects discussed herein.

An embodiment of a plug-in device 10 is illustrated in FIG. 1. Plug-in device 10 may be configured to be plugged into a mating OBD device port on an automotive vehicle. Plug-in device 10 may be configured to download information from the automotive vehicle, such as telematics information, or diagnostic information regarding operation of the vehicle.

Plug-in device 10 may include a base 12 and a cover 14 releasably secured to base 12, with base 12 positioned at a first end 13 of plug-in device 10 and cover 14 positioned at an opposed second end 15 of plug-in device 10. In certain embodiments, base 12 and cover 14 may be formed of plastic, and either or both of base 12 and cover 14 may be translucent. Cover 14 may be secured to base 12 in snap-fit fashion with one or more tabs (not shown) formed on one of cover 14 and base 12, and one or more mating recesses (not shown) formed on the other of cover 14 and base 12. Other means of releasably engaging cover 14 to base 12 will become readily apparent to those skilled in the art, given the benefit of this disclosure.

Base 12 may have a plug portion 16 at first end 13 of plug-in device 10 that is received in the OBD device port of a vehicle, after which a connection is established between the OBD device and the internal components of plug-in device 10 in known fashion. Plug portion 16 may be substantially rectangular in cross-section in order to mate with the standard OBD device ports of vehicles.

The term "substantially" as used herein is meant to mean mostly, or almost the same as, within the constraints of sensible commercial engineering objectives, costs, manufacturing tolerances, and capabilities in the field of plug-in device manufacturing and use. Similarly, the term "approximately" as used herein is meant to mean close to, or about a particular value, within the constraints of sensible commercial engineering objectives, costs, manufacturing tolerances, and capabilities in the field of plug-in device manufacturing and use.

Figure 2:
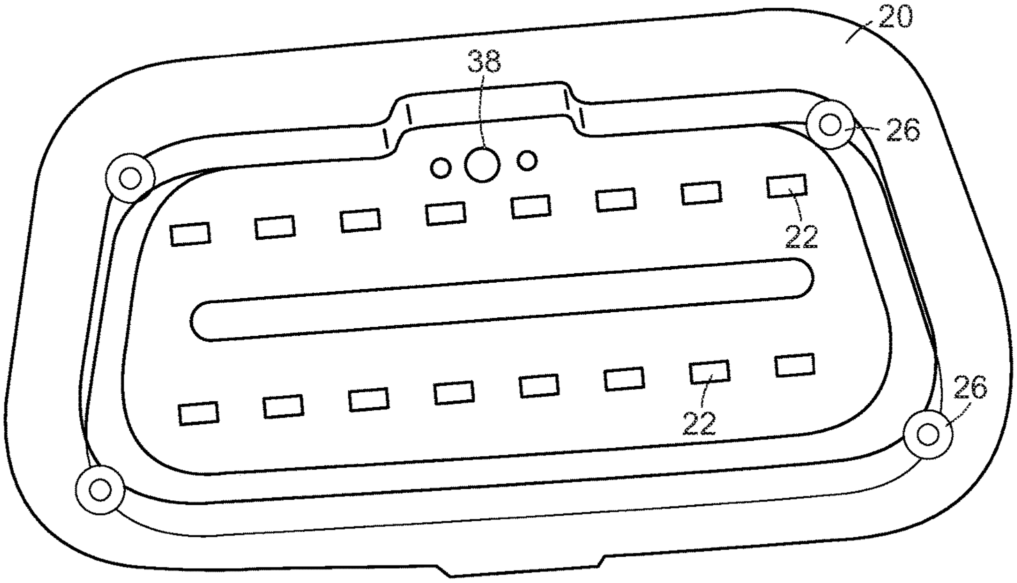
FIG. 2 depicts an end view of a base of the plug-in device of FIG. 1.

Base 12 may have a flange portion 20, adjacent to an inward of plug portion 16 that is the portion of base 12 to which cover 14 is releasably attached. As seen in FIG. 2, which depicts flange portion 20 in an unassembled state, flange portion 20 may include a plurality of pin apertures 22 through which pins 24 (seen within plug portion 16 in FIG. 1) of a PCB, seen and described below, extend. In the illustrated embodiment, flange portion 20 includes 16 pin apertures 22, in two rows of eight in order to comply with the industry standard for automotive vehicle OBD's. It is to be appreciated that other embodiments could include more than, or fewer than, the 16 pins 24 and mating apertures 22 illustrated here.

Flange portion 20 may include a plurality of threaded apertures 26 that receive mating threaded fasteners that secure a PCB, each of which is seen and described below, to flange portion 20. In the illustrated embodiment, flange portion 20 includes four threaded apertures 26. It is to be appreciated that flange portion 20 may include more or less than four threaded apertures 26 that are configured to receive mating threaded fasteners. In certain embodiments, as seen in FIG. 2, flange portion 20 may have a trapezoidal cross-section. It is to be appreciate that flange portion 20 may have other shapes such as rectangular, or square. Other suitable shapes for flange portion 20 will become readily apparent to those skilled in the art, given the benefit of this disclosure.

Figure 3:
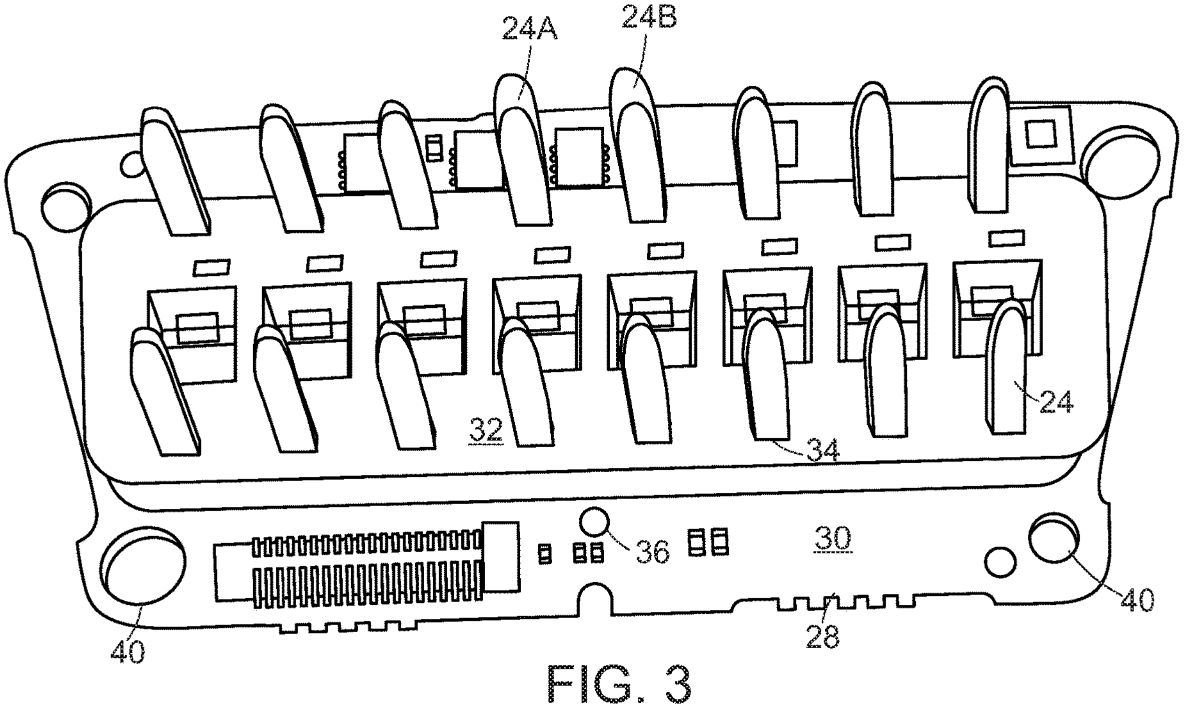
FIG. 3 depicts a perspective view of a first surface of a first PCB of the plug-in device of FIG. 1.
Figure 4:
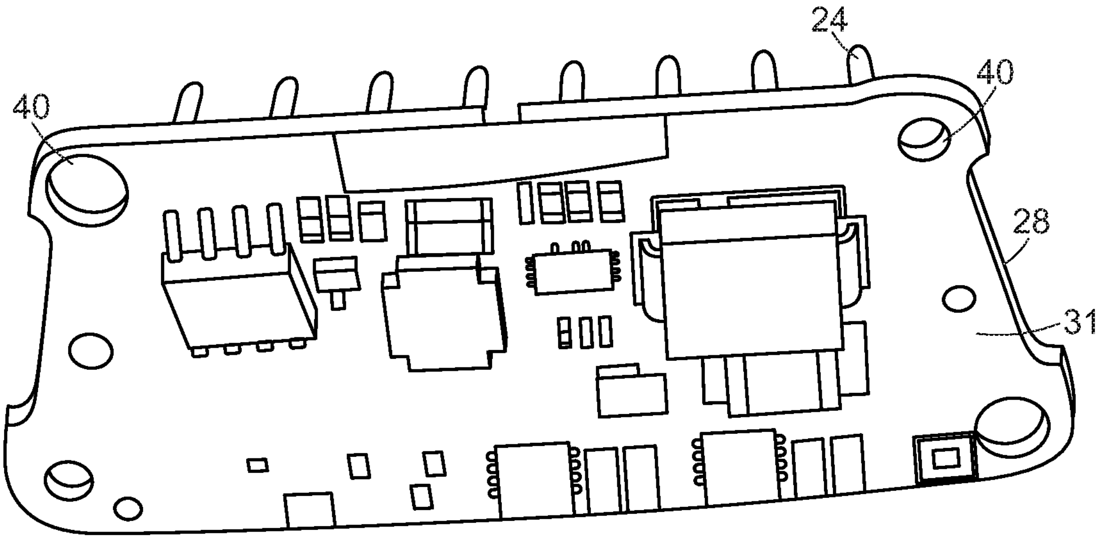
FIG. 4 depicts a perspective view of a second surface of the first PCB of the plug-in device of FIG. 1.

As seen in FIGS. 3-4, a first PCB 28 may include a variety of components on a first surface 30 thereof and on an opposed second surface 31, with first surface 30 facing flange portion 20 and second surface 31 facing cover 14 when plug-in device is assembled. First PCB 28 may include a plurality of pins 24. In the illustrated embodiment, each of pins 24 is mounted to first PCB 28 such that they are electrically independent of one another. In the illustrated embodiment, first PCB 28 includes 16 pins positioned in two rows of eight. As noted above, each pin 24 is received in a corresponding pin aperture 22 of flange portion 20 of base 12 when plug-in device 10 is assembled. Pins 24 extend outwardly from first surface 30 of first PCB 28. First surface 30 of first PCB 28 may define a first plane, and pins 24 may extend outwardly and substantially perpendicularly from this plane. It is to be appreciated that not all of pins 24 are populated, that is, not every pin 24 serves a function for plug-in device. The number of active pins 24 may vary, depending on the particular application for which plug-in device 10 is used.

In certain embodiments, pins 24 may be wave soldered onto first surface 30 of first PCB 28, which can provide reduced costs and improved manufacturability as compared to spot soldering individual pins as is done with pins that are connected to a PCB in pass-through fashion. Additionally, wave soldering pins 24 onto first PCB 28 provides a secure connection that adds structural integrity and strain relief as plug-in device 10 is removed from an OBD device port, reducing the risk of pins 24 becoming loose or getting damage. Having pins 24 extend substantially perpendicular to the first plane of first PCB 28 also helps reduce strain on pins 24 as they are removed from an OBD device.

A sleeve 32 may be positioned on first surface 30 of first PCB 28 at the base of pins 24. Sleeve 32 may include a plurality of sleeve apertures 34, each of which receives a corresponding pin 24. Sleeve 32 may be formed of plastic in certain embodiments. Sleeve 32 may serve to align pins 24, and provide structural integrity and additional strain relief for pins 24 when plug-in device 10 is removed from an OBD device port.

As seen in FIG. 3, first PCB 28 may include a contact point 36, which may be engaged by a reset pin (not shown) of a reset device (not shown). The reset pin of the reset device may be inserted through a reset aperture 38 formed in flange portion 20, as seen in FIG. 2, which is aligned with contact point 36 when plug-in device 10 is in an assembled condition. When the reset pin of the reset device is inserted into reset aperture 38 and engages contact point 36, a digital key, or waveform, may be downloaded from the reset device onto first PCB 28, which unlocks the device, allowing a user access to plug-in device 10. For example, once plug-in device has been unlocked with the digital key or waveform, plug-in device 10 may be operated by the user in any desired fashion. For example, a Bluetooth connection may be established, allowing user access to various functions of plug-in device 10. Other available options include the ability to reprogram plug-in device 10, the ability to erase all data on plug-in device 10. Other applications available to a user when plug-in device 10 has been unlocked will become readily apparent to those skilled in the art, given the benefit of this disclosure.

In the illustrated embodiment, reset aperture 38 is open, allowing a reset pin to be inserted multiple times. In other embodiments, reset aperture 38 may be waterproofed by providing a thin membrane of plastic or a thin layer of other material (not shown) over reset aperture 38. Once user desires to unlock plug-in device 10, a reset pin that is sharp enough to pierce the thin membrane or thin layer is inserted into reset aperture 38, allowing the digital key, or waveform, to be downloaded to first PCB 28, thereby unlocking plug-in device 10.

In certain embodiments, as seen in FIG. 3, two pins 24A, 24B may be longer than the remaining pins. When base 12 of plug-in device 10 is inserted into an OBD device port, the longer pins 24A, 24B, engage with mating female connectors of the OBD device before the remaining pins, thereby establishing a ground and preventing shorting of plug-in device 10 and the OBD device.

As seen in FIGS. 3-4, first PCB 28 may include a plurality of board apertures 40, each of which receives one of the threaded fasteners, seen and described below, that engage with threaded apertures 26 of flange portion 20, thereby securing first PCB 28 to flange portion 20. In the illustrated embodiment, first PCB 28 includes four board apertures 40.

However, it is to be appreciated that any number of board apertures 40 can be formed in first PCB 28.

Figure 5:
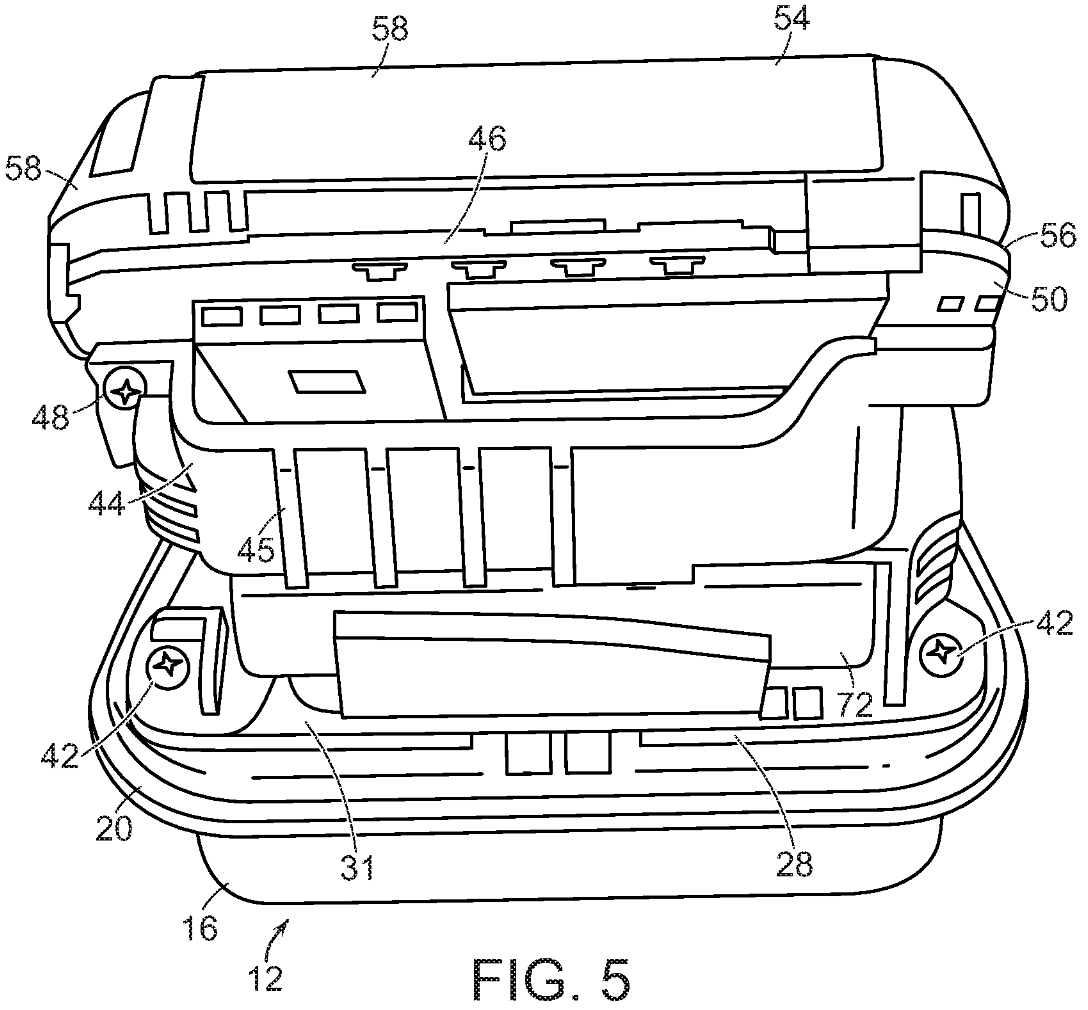
FIG. 5 depicts a perspective view of a portion of the plug-in device of FIG. 1 in an assembled condition.
Figure 6:
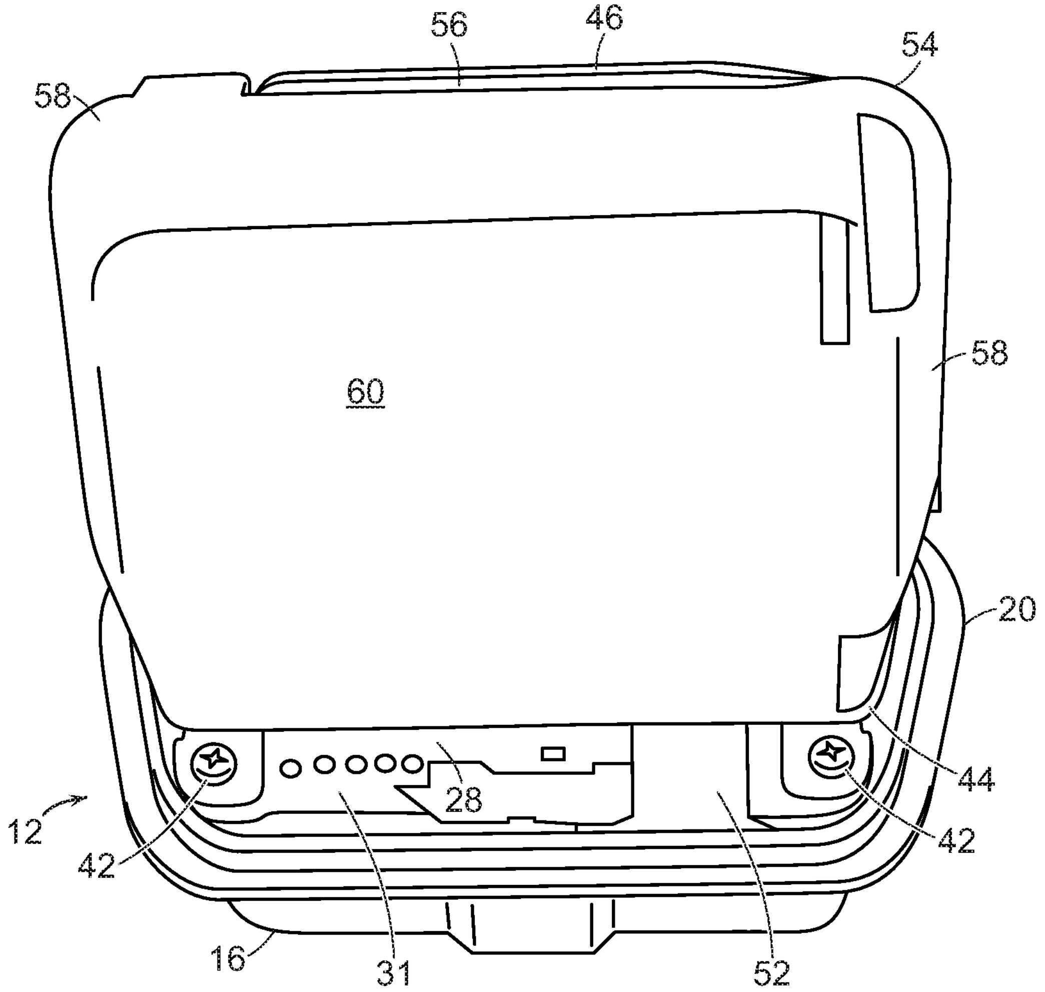
FIG. 6 depicts an alternative perspective view of a portion of the plug-in device of FIG. 1 in an assembled condition.
Figure 7:
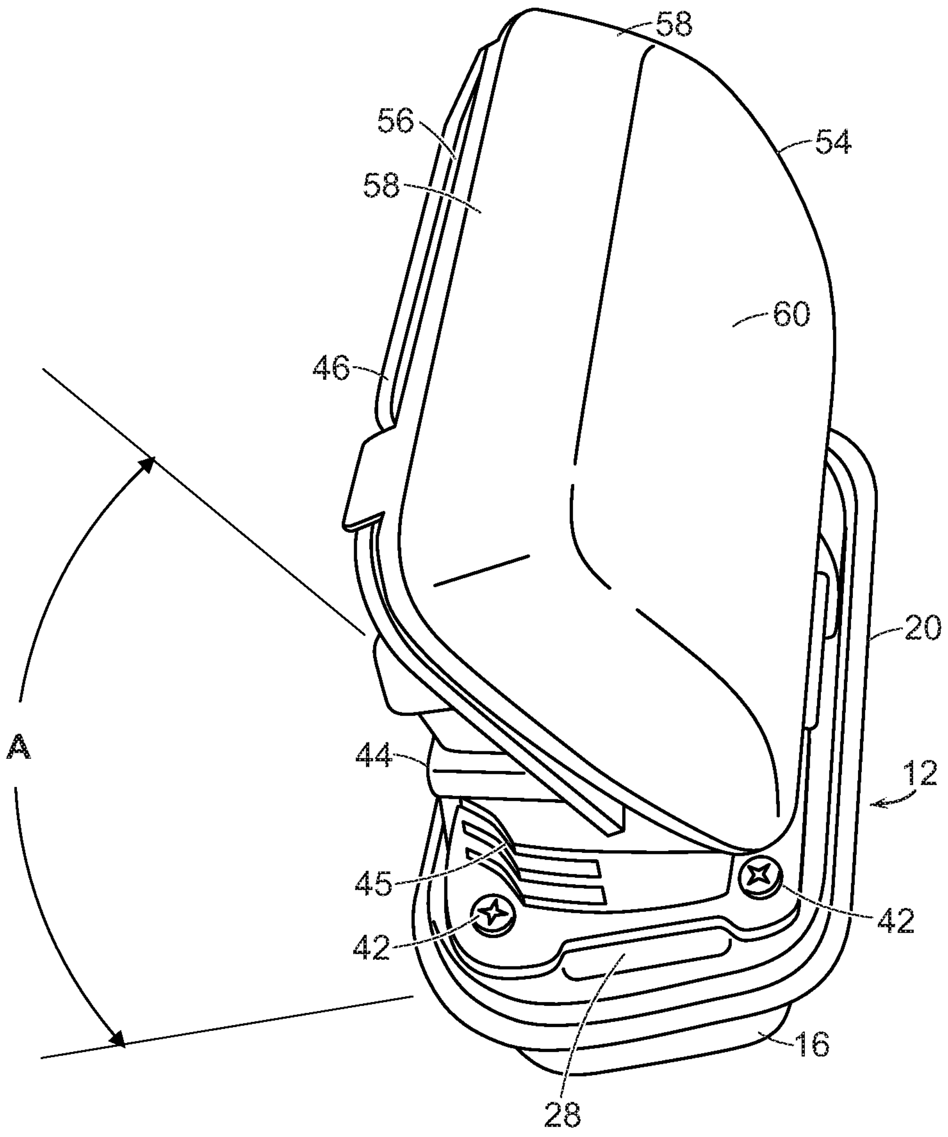
FIG. 7 depicts another alternative perspective view of a portion of the plug-in device of FIG. 1 in an assembled condition.

As seen in FIGS. 5-7, first PCB 28 is seen mounted to flange portion 20 of base 12. A plurality of threaded fasteners 42 extend through board apertures 40 in first PCB 28 and are threadingly received in threaded apertures 26 of flange portion 20. In the illustrated embodiment, threaded fasteners 42 are screws. A bracket 44 may be provided with a plurality of bracket apertures (not visible) through which threaded fasteners 42 extend, thereby securing bracket 44 and first PCB to flange portion 20 of base 12. In certain embodiments, bracket 44 may also serve as an antenna for plug-in device 10. For example, bracket 44 may serve as a Bluetooth antenna for plug-in device 10. It is to be appreciate that bracket 44 may be electrically connected to other elements of plug-in device 10, such as other antennas, which may expand the size of the antenna of bracket 44. As seen in FIG. 5, a plurality of ribs 45 may be formed along an exterior of bracket 44, which may add more surface area for the antenna aspect of bracket 44, and may provide additional strength for bracket 44.

A second PCB 46 may be included in plug-in device 10 and may be secured to bracket 44. In the illustrated embodiment, a pair of threaded fasteners 48 (only one of which is visible in FIG. 5), such as screws, for example, may extend through corresponding apertures in bracket 44 (not visible) and apertures (not visible) in second PCB 46 such that a first surface 50 of second PCB 46 abuts bracket 44. Second PCB 46 may be connected to first PCB 28 by way of a flexible connector 52, e.g., a ribbon cable, as seen in FIG. 6, which may carry power and signals between first PCB 28 and second PCB 46.

As seen most clearly in FIG. 7, second PCB 46 may define a second plane and may be secured to bracket 44 such the second plane of second PCB 46 is at an acute angle A with respect to the first plane of first PCB 28. In certain embodiments, the second plane of second PCB 46 may be at an angle A of approximately 45° with respect to the first plane of first PCB 28. By mounting second PCB 46 at an acute angle A with respect to the first plane of first PCB 28, second PCB 46 can be longer than it would be if it were mounted at an angle of 90° with respect to first PCB 28, thereby reducing the profile of plug-in device 10. This is especially advantageous when plug-in device 10 is mounted under the dashboard of a motor vehicle, as this can reduce the risk of the user banging into plug-in device 10 with their knee when entering or exiting, or even just sitting in the motor vehicle.

As seen most clearly in FIGS. 5-7, an antenna housing 54 may be mounted to a second surface 56 of second PCB 46 opposed to first surface 50. Threaded fasteners 48, which extend through apertures in bracket 44 and second PCB 46 are threadingly received in threaded apertures 57, seen in FIG. 8, in antenna housing 54, thereby securing both second PCB 46 and antenna housing 54 to bracket 44.

Antenna housing 54 may be substantially dome-shaped with sidewalls 58 that extend outwardly away from second surface 56 of second PCB 46 and taper inwardly. Antenna housing 54 may have a curved top 60 that is joined to sidewalls 58, and the junctions between sidewalls 58 and top 60 may be curved rather than sharp corners.

Figure 8:
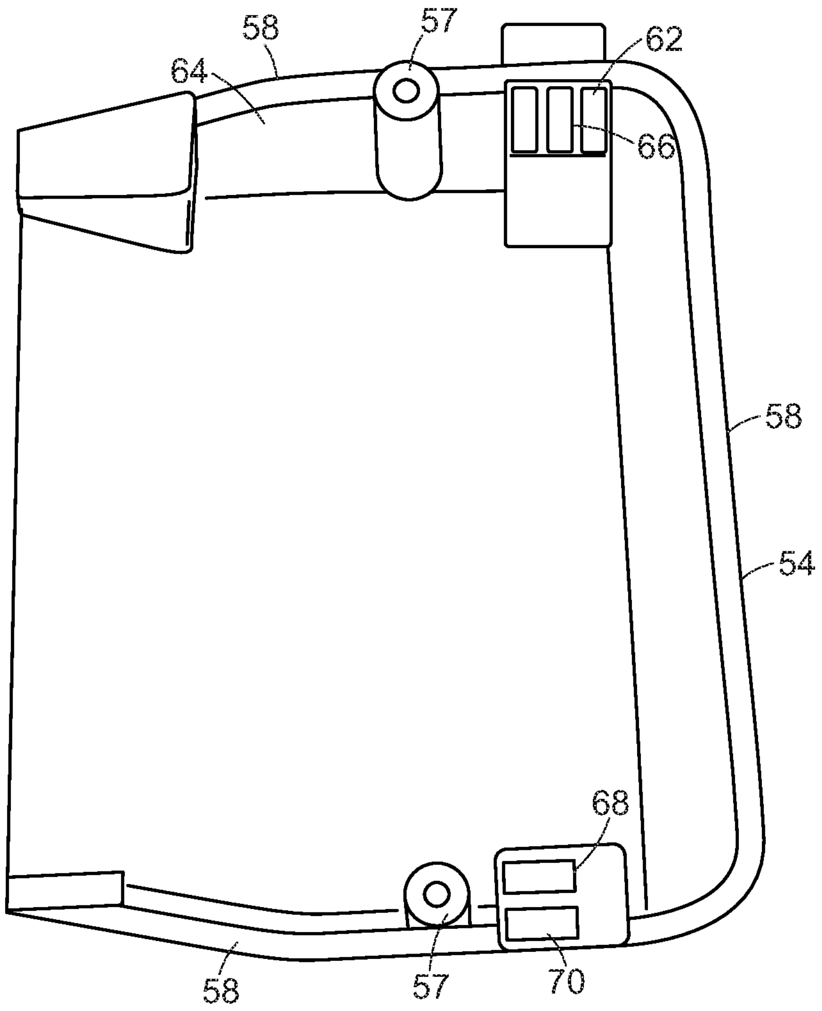
FIG. 8 depicts a plan view of an antenna housing of the plug-in device of FIG. 1.
Figure 9:
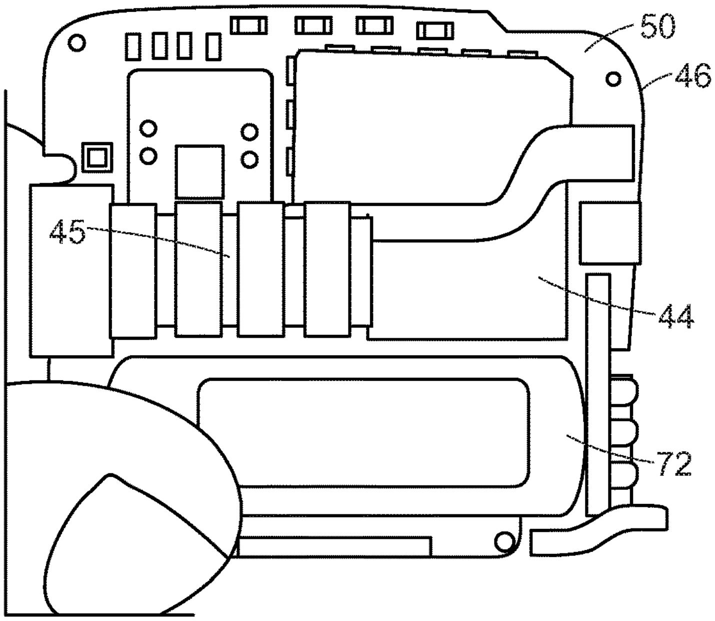
FIG. 9 depicts a perspective view of a second PCB of the plug-in device of FIG. 1.

As seen in FIG. 8, one or more antennas may be incorporated into antenna housing 54. In the illustrated embodiment, a first antenna 62 may be positioned within antenna housing 54. First antenna 62 may be a sheet of metal, such as copper, for example, that extends across an interior surface 64 of antenna housing 54. As seen in FIG. 9, only the contact pads 66 of first antenna 62 are visible in FIG. 9.

A second antenna 68 may also be molded into interior surface 64 of antenna housing 54, with contact pads 70 of second antenna 68 being visible in FIG. 9. Second antenna 68 may also be formed of a sheet of metal, such as copper, for example, that extends across interior surface 64 of antenna housing 54. In certain embodiments, one of first antenna 62 and second antenna 68 may be for GPS and the other of first antenna 62 and second antenna 68 may be for cellular applications. As noted above, a third antenna may be incorporated into bracket 44, which may be for Bluetooth applications, for example.

In certain embodiments, first antenna 62 and second antenna 68 may be embedded within the material of antenna housing 54, which may be formed of plastic, for example. In other embodiments, first antenna 62 and second antenna 68 may be mounted directly onto interior surface 64 of antenna housing 54.

By molding first antenna 62 and second antenna 68 into the interior surface 64 of antenna housing 54, which includes tapered surfaces and non-linear curved surfaces, the antennas are provided with a multi-faceted surface that is at least 5% larger than could be incorporated in a flat antenna, and allows first antenna 62 and second antenna 68 to fit into antenna housing 54 in a better fashion. Further, such a construction provides first antenna 62 and second antenna 68 to create different radiating patterns and combine RF into focused beams, which can improve performance and fits into antenna housing 54 in a better fashion.

Additionally, by mounting antenna housing 54 on the second surface 56 of second PCB 46, first antenna 62 and second antenna 68 may be positioned proximate second end 15 of plug-in device 10, which may improve the performance of first antenna 62 and second antenna 68 as they are closer to the interior cabin of the motor vehicle and more remote from the metal of the motor vehicle.

As seen in FIG. 9, a capacitor 72 may be mounted to second surface 56 of second PCB 46. Capacitor 72 may serve as a power backup to allow a download of information from plug-in device 10 if it is unplugged in a non-standard fashion. Thus, if a user unplugs plug-in device 10 from the OBD device port while it is in an operating mode, there is a window of time, in which plug-in device is still powered, allowing telematics, GPS, or other types of data to be retrieved from plug-in device. In certain embodiments, capacitor 72 may provide enough power to allow plug-in device 10 to run for between approximately 20 seconds and approximately 2 minutes.

Figure 10:
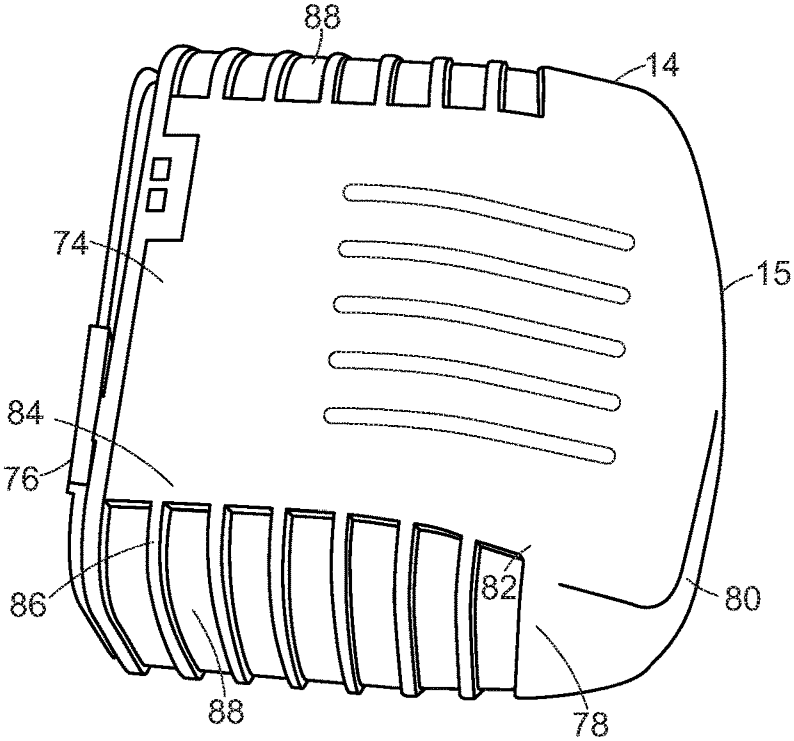
FIG. 10 depicts a perspective view of the cover of the plug-in device of FIG. 1.

As seen in FIG. 10, cover 14 may have a first portion 74 with an open end 76 that is secured to flange portion 20 of base 12, and receives second PCB 46 and antenna housing 54. First portion 74 may have a trapezoidal cross-section to mate with the shape of flange portion 20. Cover 14 may have a second portion 78 extending from first portion 74 and terminating in a closed end 80 at second end 15 of plug-in device. Cover 14 may have a tapered sidewall 82 that mates with the shape of angled second PCB 46 and antenna housing 54, providing a more compact size for cover 14 and plug-in device 10.

Figure 11:
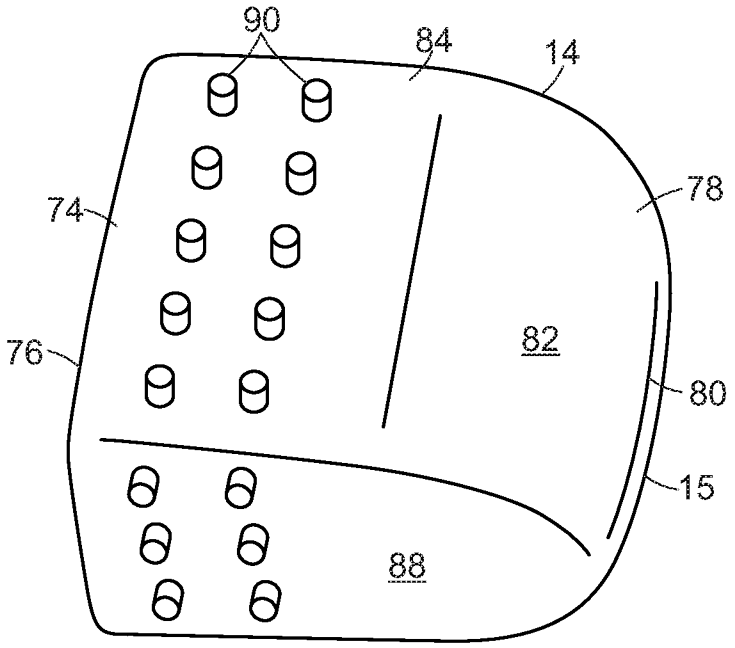
FIG. 11 depicts a perspective view of an alternative embodiment of the cover of the plug-in device of FIG. 1.

In certain embodiments an exterior surface 84 of cover 14 may be provided with a plurality of surface irregularities 86 that help a user grasp plug-in device 10 when removing it from an OBD device port. In the illustrated embodiment, surface irregularities 86 take the form of a plurality of ribs 86 formed on opposed sidewalls 88 of cover 14. In other embodiments, surface irregularities 86 could be formed on the entire periphery of cover 14. It is to be appreciated that surface irregularities 86 need not be formed as a series of parallel ribs 86 as illustrated in FIG. 10. Surface irregularities 86 may take any form, such as individual bumps or projections 90 as illustrated in FIG. 11, or other raised shapes positioned on exterior surface 84. Further, it is to be appreciated that surface irregularities 86 could be dimples, grooves or recesses formed in exterior surface 84 of cover 14. Any type or shape of surface irregularities 86 may enhance the user's grip when removing plug-in device 10 from its installed condition in an OBD device port.

As noted above, cover 14 may be translucent, which allows lights, such as LED lights (not shown), on first PCB 28 and second PCB 46 to be visible to a user through cover 14.

By providing a plug-in device with a first PCB mounted to a base portion and a second PCB mounted to the base portion at an acute angle with respect to the first PCB, a more compact plug-in device can be provided to users, which advantageously reduces the chances of the user bumping into the device while in a motor vehicle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A plug-in device comprising:

a base having a plurality of apertures extending therethrough;

a first PCB having a first surface defining a first plane, and a plurality of pins connected to and extending outwardly from the first surface, each pin being received in one of the plurality of apertures of the base;

a bracket securing the first PCB to the base;

a second PCB secured to the bracket, extending outwardly from the first PCB and defining a second plane, the second plane being at an acute angle with respect to the first plane;

an antenna housing secured to the bracket and the second PCB and including at least a first antenna; and a cover releasably secured to the base.

2. The plug-in device of claim 1, wherein the second plane is at an angle of approximately 45° with respect to the first plane.

3. The plug-in device of claim 1, wherein the plurality of pins are surface mounted to the first PCB.

4. The plug-in device of claim 1, wherein the plurality of pins are wave soldered to the first PCB.

5. The plug-in device of claim 1, further comprising a sleeve having a plurality of apertures, the sleeve abutting the first surface of the first PCB, each pin being received in one of the apertures of the sleeve.

6. The plug-in device of claim 5, wherein the sleeve comprises a sheet of plastic material.

7. The plug-in device of claim 1, wherein the antenna housing comprises a plastic shell and a first sheet of copper.

8. The plug-in device of claim 7, wherein the first sheet of copper comprises a GPS antenna.

9. The plug-in device of claim 7, further comprising a second sheet of copper extending along an interior surface of the plastic shell.

10. The plug-in device of claim 9, wherein the second sheet of copper comprises a cellular antenna.

11. The plug-in device of claim 9, wherein the first sheet of copper and the second sheet of copper are embedded in the plastic shell.

12. The plug-in device of claim 9, wherein the first sheet of copper and the second sheet of copper are mounted to the interior surface of the plastic shell.

13. The plug-in device of claim 1, wherein the bracket comprises a Bluetooth antenna.

14. The plug-in device of claim 1, further comprising a reset aperture formed in the base and a contact point positioned on the first PCB, the reset aperture being aligned with the contact point when the cover is attached to the base.

15. The plug-in device of claim 1, further comprising a plurality of surface irregularities on an exterior surface of the cover.

16. The plug-in device of claim 15, wherein the surface irregularities comprise ribs.

17. The plug-in device of claim 1, wherein two of the pins of the first PCB have a length longer than each remaining pin on the first PCB.

18. The plug-in device of claim 1, wherein the cover includes a tapered sidewall.

19. The plug-in device of claim 1, wherein the antenna housing includes sidewalls that are tapered inwardly and a curved cover.

20. The plug-in device of claim 1, wherein the cover is formed of a translucent material.

* * * * *